Jan. 8, 1935.   H. S. HASBROUCK ET AL   1,986,893
STEAM HEATER FOR MOTOR VEHICLES
Filed Nov. 4, 1929
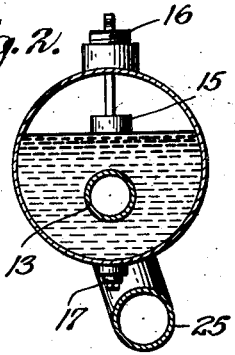
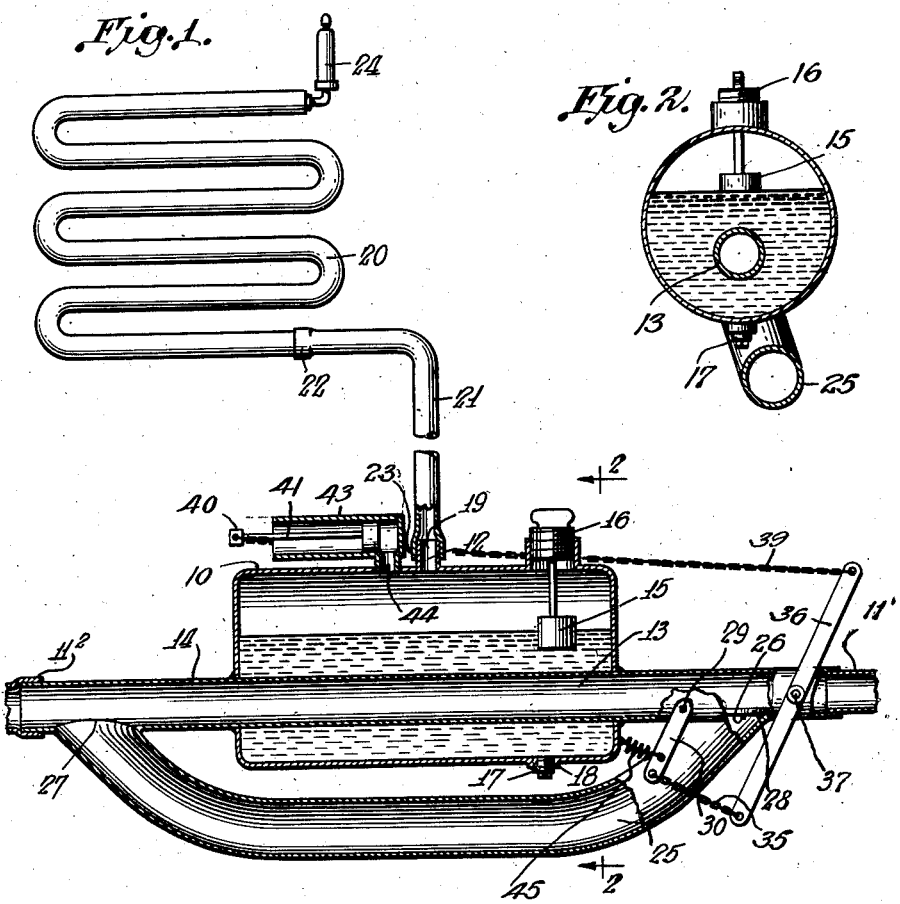
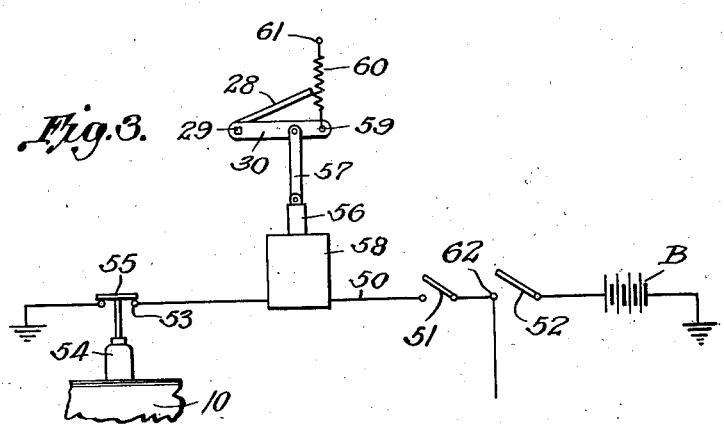
INVENTOR
Harold S. Hasbrouck
Edward H. Hubert
BY
their ATTORNEYS Patented Jan. 8, 1935

1,986,893

UNITED STATES PATENT OFFICE 1,986,893

STEAM HEATER FOR MOTOR VEHICLES

Harold S. Hasbrouck, Boonton, N. J., and Edward H. Hubert, New York, N. Y.

Application November 4, 1929, Serial No. 404,858

5 Claims. (Cl. 257—241)

Our present invention relates more particularly to heating systems for enclosed motor vehicles and while it has a preferred application to passenger automobiles, it is also applicable to passenger buses, to air vehicles and boats, and to buses designed for the transportation of merchandise of the character that requires protection from the cold.

It is an object of the invention to provide a heating system for a motor vehicle, more particularly for one equipped with an internal combustion engine, which system shall involve parts the construction of which is extremely simple, the cost of which is low, and which can be expeditiously installed by an ordinary mechanic on motor vehicles of standard construction without re-design thereof.

Another object is to provide a heating system of the above type which has no parts that are apt to become out of order, but which even if damaged, can in no way hamper the normal operation of the engine or vehicle, the heating system being completely dissociated from the water cooling system or other parts of the engine.

Another object is to provide a system of the above type, which will exclude products of combustion or objectionable odors from the enclosed vehicle body, and which is proof against the leakage of water into the body of the vehicle, or the bursting of radiator pipes due to the freezing of water remaining therein after the vehicle engine has stopped running and is left in the cold, and which is inherently safe from bursting or explosion due to eventual rise of pressure therein.

Another object is to provide a system of the above type, by which heat can readily and conveniently be shut off and on at will and which lends itself moreover to automatic control for any desired temperature of operation.

The invention is preferably embodied in a steam generator comprising a boiler containing water and in heat interchange relation with respect to the exhaust pipe of the engine. The boiler is connected to a steam radiator, preferably rising therefrom and equipped with the usual valve.

In a preferred embodiment, the boiler has a pipe length longitudinally therethrough protruding from the ends and connected directly to severed lengths of the exhaust pipe so that the water within the boiler will be heated therefrom. A by-pass pipe about the boiler is connected at its opposite ends to the protruding ends of the boiler pipe and a valve suitably controlled, directs the exhaust gases alternatively through the steam generator or through the by-pass, or if desired may be set in any of a plurality of intermediate positions to control the division of the exhaust gases through the alternative paths for imparting any desired degree of heat to the steam generator.

In the accompanying drawing in which are shown one or more of various possible embodiments of the several features of the invention, Fig. 1 is a view partly in section and partly in elevation showing the exhaust pipe of a motor vehicle, a steam generator and a heating unit connected with the steam generator, Fig. 2 is a sectional view taken on the line 2—2 of Fig. 1, Fig. 3 is a diagrammatic view of an electrical device for controlling the operation of the steam generator.

In the drawing is shown a steam generator 10 comprising a metal vessel, preferably circular in cross-section, and closed except for the outlet opening 12 thereof. Longitudinally through the generator 10 and preferably below the axis thereof extends a pipe 13 preferably welded or brazed in the end walls of the vessel 10 and through which is conveyed exhaust gas from the engine of the vehicle. The ends of pipe 13 extend sufficiently beyond the end walls of the boiler 10 to provide means for telescopic fit in the severed ends 11' and 11² of the exhaust pipe, to which it is welded or brazed or fastened by means of a clamp, (not shown).

The boiler, which may be heat insulated by a covering of asbestos or the like, is filled with water to substantially the level indicated in Fig. 1, which provides a steam space in the upper portion thereof, and as illustrated in Fig. 2, the eccentric disposition of the pipe which forms the gas passage 13, permits of the said pipe occupying a position substantially in the center of the body of water, thereby affording substantially uniform heating of the water by the heated exhaust gases in their travel through the pipe 13.

The boiler 10 may be provided with a suitable float gauge 15 which, in turn, may be operatively associated with a filling opening closed by a plug 16, in such manner that during filling of the boiler 10, the level of the water therein will be indicated. A suitable drain opening 17 closed by a plug 18 may be provided in the lower portion of the boiler 10.

The radiator 20 which is equipped with the usual air valve 24, is suitably situated within the body of the motor vehicle in any desired location, preferably vertically against a wall, but, if desired, the radiator may be disposed under the floor of the vehicle, enclosed in a suitable compartment (not shown) provided therefor, with a grille (not shown) covering the heating unit to permit the ready circulation of air heated thereby. The generator or boiler 10 being carried by the motor vehicle chassis and the radiator 20 being carried by the body, there is necessarily relative movement between them during operation of the vehicle and this is accommodated by rubber tube 21 connecting said elements, by telescopic connection at one end over nipple 19 and at the other end 22 over the inlet to the radiator. The rubber tube 21 has the added function of affording a safety or blow-off device which will give way under excess pressure of steam generated in the boiler 10.

A by-pass pipe 25 is connected at its ends as at 26 and 27 to the boiler pipe beyond the ends of generator 10. The flow of exhaust gases either through the passage 13 into the boiler 10, for heating purposes, or through the by-pass pipe 25, when steam heat is not desired, may be controlled by a valve 28 pivotally mounted in the boiler pipe as at 29, at the engine side of the generator.

In intermediate positions of valve 28, more or less heating may be provided as is obvious.

In order to install our heating system upon a completed motor vehicle, a suitable length need merely be excised from the exhaust pipe, and the protruding ends of pipe 13 of the pre-assembled heater unit are telescoped into the severed ends of pipe 11 to bridge the gap and are welded, brazed or otherwise fastened. The radiator 20 is installed in the body and the hose connection 21 established. The boiler 10 is filled with water to the extent indicated in Figs. 1 and 2, as previously described and the installation is complete and ready for use. When the manufacturer installs the heater as standard equipment, the boiler would ordinarily be passed over the exhaust pipe and welded thereto.

The heater has various advantages of steam heating systems in buildings. No gases or products of combustion, complete or incomplete can enter the vehicle. When the engine is brought to rest, any steam remaining in the radiator condenses and the water trickles back by gravity into the boiler 10, so that there is no danger of bursting of pipes by freezing of water therein, should the automobiles be left idle in a cold garage or on a cold highway. Since the boiler is only partly filled with water, freezing will not entail bursting or other injury.

The simplicity of the construction is manifest. The installation involves merely a slight alteration in the exhaust pipe, a part which is itself devoid of mechanism. The installation has no mechanism other than the simple flap valve directly controlled by hand.

In Fig. 1 the arm 30 is urged by an associated coil spring 45 which tends to retain valve 28 in the by-pass closing position shown. Arm 30 is connected by means of a chain 35 to an operating lever 36, pivotally supported between its ends at 37, illustratively upon the forward end of pipe 13. Connected to the upper end of the lever 36 at 38, is a chain or similar tension member 39, which is connected at 40 to the rod 41 of a piston element 42, within a cylinder 43, which has communication through passage 44 with the interior of the boiler 10.

When the steam generated in the boiler 10 reaches a predetermined pressure, the piston 42 will be moved to the left in Fig. 1, and through connection 39, operating lever 36. chain 35 and arm 30, valve 28 is moved to corresponding position, to determine the division of the exhaust gases through the pipes 13 and 25. If the pressure generated in the boiler 10 be sufficient, the valve will be moved to completely open the by-pass 25 and prevent the exhaust gases entering the passage 13. No heat being now delivered to generator 10, the pressure therein subsides, and the contraction of spring 45 thereupon re-establishes communication to heating pipe 13. Thus valve 28 is caused automatically to open and close in order to maintain the steam radiator within a fairly small range of temperature. A suitable lock may be provided (not shown) to retain valve 28 in by-pass opening position, in order to place the heater out of operation.

In the embodiment of Fig. 3 is shown an alternative automatic valve control in which electric means replaces the tension member employed in the embodiment of Fig. 1.

The steam generator has a piston, diaphragm or other pressure responsive control member 54, the details of which are not material to this invention, which controls an electric circuit, by which the position of the valve 28 is determined electromagnetically. There is shown a solenoid 58, the core 56 of which is connected by a link 57 to an arm 30 pivoted about the axis 29 which mounts the control valve 28. A coil spring 60 maintains the control valve 28 in position to shut off the heater, when the engine is stationary. The solenoid is preferably connected with the battery B and its circuit is controlled by means of an electric contact bridging member 55 connected to the pressure control and closed across contacts 53 while the pressure in the steam generator is low. Accordingly, in operation while the generator pressure is low and steam is, therefore, to be generated, the solenoid 58 is energized to pull down the arm 30 and bring the valve 28 to by-pass closing position. When the pressure within the generator increases, the bridging contact is lifted, the circuit to the solenoid is broken and the spring 60 immediately snaps the valve of the heater closed, so that the heat is off. When the pressure subsequently has subsided in the generator and the pressure control 54 allows the bridging contact 55 to retract, the solenoid circuit is again closed to again open the valve 28 and set the heater into operation.

The solenoid is preferably of high resistance, so that it consumes relatively little current from the storage battery. As a further safeguard, it is preferable to interrelate the manual control switch 51 with the ignition switch 52, so that even the small waste of current through the solenoid is avoided as long as the ignition circuit is open and the engine out of operation. The interrelation will be immediately apparent to those skilled in the art. In a purely diagrammatic way, the ignition switch 52 is shown with a contact 62 connected to the hinge end of switch 51, so that regardless whether the heater is on or off, the ignition circuit may be operative, but the heater circuit can be operative only so long as the ignition switch is closed.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawing, shall be interpreted as illustrative and not in a limiting sense.

Having thus described our invention, what we claim as new and desire to secure by Letters Patent is:

1. In a heater of the class described, the combination with the exhaust pipe of a motor vehicle, of a steam generator including a vessel through which the exhaust pipe passes, a by-pass pipe about said vessel connected at its opposite ends to said exhaust pipe, a valve movable to one position to pass the exhaust gases through the steam generator and to another position to pass the exhaust gases through the by-pass pipe, electrical means for operating said valve to one of said positions, and means controlled by the condition of the generator for controlling the operation of said electrical means.

2. In a heater of the class described, the combination with the exhaust pipe of a motor vehicle, of a steam generator including a vessel through which the exhaust pipe passes, a by-pass pipe about said vessel connected at its opposite ends to said exhaust pipe, and an electrically actuated valve for controlling the flow of exhaust gases either through said generator or through said by-pass pipe.

3. In a heater of the class described, the combination with the exhaust pipe of a motor vehicle, of a steam generator including a vessel through which the exhaust pipe passes, a by-pass pipe about said vessel connected at its opposite ends to said exhaust pipe, an electrically actuated valve for controlling the flow of exhaust gases either through said generator or through said by-pass pipe, and steam pressure actuated means for controlling the position of said valve.

4. In a heater of the class described, the combination with the exhaust pipe of a motor vehicle, of a steam generator including a vessel through which the exhaust pipe passes, a by-pass pipe about said vessel connected at its opposite ends to said exhaust pipe, a valve for passing the exhaust gases either through the steam generator or there-around through said by-pass pipe, a spring for holding said valve in one of its positions, and separate means for moving said valve to its other position against the action of said spring, said last mentioned means being electrically operated.

5. In a heater of the class described, the combination with the exhaust pipe of a motor vehicle, of a steam generator including a vessel through which the exhaust pipe passes, a by-pass pipe about said vessel connected at its opposite ends to said exhaust pipe, a valve for passing the exhaust gases either through the steam generator or there-around through said by-pass pipe, electrical means for moving said valve to one of its positions, and means for holding said valve in the other position.

HAROLD S. HASBROUCK.
EDWARD H. HUBERT.